United States Patent [19]
Gomez et al.

[11] Patent Number: 6,119,193
[45] Date of Patent: Sep. 12, 2000

[54] ARRANGEMENT FOR CONTROLLING PERIPHERAL COMPONENT INTERCONNECT (PCI) UNITS FROM A PLURALITY OF CONTROL PROCESSORS

[75] Inventors: Joseph Jonas Bosita Gomez; Conrad Martin Herse, both of Naperville, Ill.

[73] Assignee: Lucent Technologies Inc., Murray Hill, N.J.

[21] Appl. No.: 08/961,998

[22] Filed: Oct. 31, 1997

[51] Int. Cl.[7] ....................................................... G06F 13/38
[52] U.S. Cl. .............................. 710/129; 710/37; 710/105
[58] Field of Search .................................. 395/306–312, 395/856–858; 710/113, 119, 122, 240, 268, 42–43, 105, 107

[56] References Cited

U.S. PATENT DOCUMENTS

| | | | |
|---|---|---|---|
| 4,454,591 | 6/1984 | Lou ............................................ | 395/306 |
| 5,636,214 | 6/1997 | Kranzler et al. .......................... | 370/438 |
| 5,673,400 | 9/1997 | Kenny ....................................... | 710/129 |
| 5,764,929 | 6/1998 | Kelley et al. ............................. | 395/287 |
| 5,793,987 | 8/1998 | Quackenbush et al. ................. | 395/280 |
| 5,805,596 | 9/1998 | Kranzler et al. ......................... | 370/445 |

*Primary Examiner*—Ayaz R. Sheikh
*Assistant Examiner*—Raymond N Phan
*Attorney, Agent, or Firm*—Werner Ulrich

[57] ABSTRACT

Apparatus for permitting any of a plurality of driver circuits to control a select lead. In the preferred embodiment, the plurality of drivers are in separate peripheral component interconnect (PCI) host bridges. The drivers when active are in one of two low impedance states. A resistor whose impedance is substantially less than the high impedance of a driver when in the inactive state is connected to ground and pulls the voltage on the select lead toward ground when none of the drivers connected to the select lead are active. Advantageously, a plurality of drivers can control a single select lead, and only a short time is required as a guard interval between the time that two different drivers control the select lead.

4 Claims, 1 Drawing Sheet

ARRANGEMENT FOR CONTROLLING PERIPHERAL COMPONENT INTERCONNECT (PCI) UNITS FROM A PLURALITY OF CONTROL PROCESSORS

TECHNICAL FIELD

This invention relates to arrangements for controlling peripheral units on a PCI bus.

PROBLEM

The use of a peripheral component interconnect (PCI) bus to access a plurality of peripheral units from a controlling processor are becoming increasingly popular as a result of the standardization of the PCI bus. These standards were designed primarily with the use of a single control processor in mind. The control processor is usually connected by a PCI host bridge which allows individual PCI units, usually called PCI clients, to be selected from control leads at the out-put of this bridge. Well known bus arbitration arrangements are used to resolve contention for the PCI bus among the bridge and the various PCI clients. This is illustrated in FIG. 1. A comparable arrangement for having two control processors access the PCI clients is shown in FIG. 2 wherein the various output leads of the PCI host bridges are simply parallelled. The use of an arrangement shown in FIG. 2 is especially desirable in telecommunications systems and other real time systems which require very high reliability performance. The two control processors provide high reliability in case of a failure of one processor and extra capacity when both processors are available.

The drivers for the bussed and unit select leads are in accordance with the PCI standards, unit which provide low impedance, low voltage or low impedance, high voltage when signals are being transmitted. Units which also drive a high impedance are specified for bussed signals. The high impedance is required to insure that units which are not transmitting will not place an excessive load on the bussed signals for the unit which is transmitting. A high impedance state is not required when transmitting unit select signals, in the prior art these are only transmitted from one unit, and a valid voltage level must be present, which can be achieved when only one transmitting unit is present by always keeping the transmitting unit in a low impedance state. A problem of the prior art, therefore, is that there is no satisfactory arrangement for driving the select leads from a plurality of sources in a PCI environment.

SOLUTION

The above problem is solved and an advance is made over the prior art in accordance with applicants' invention wherein select leads driven by more than a single PCI host bridge use a driver capable of transmitting a high impedance and connected by a resistance to ground (below low voltage signal of the PCI standard). Advantageously, this allows multiple transmitting units to be connected to the select leads and ensures that a valid voltage level exists when all units are transmitting a high impedance. Advantageously, this minimizes the time during which the signal on a control or select lead is in an indeterminate state because one of the bridges have been turned off so that another bridge can be turned on. Advantageously, this allows the select lead to be controlled before the PCI bus has been released by another unit so that the PCI client can be prepared to receive signals from the PCI bus. Advantageously, this arrangement minimizes the time that the signal at the state of a select lead, is indeterminate and therefore, minimizes the transition time between successive accesses by the two host bridges of a common PCI client.

DETAILED DESCRIPTION

Figure 1:
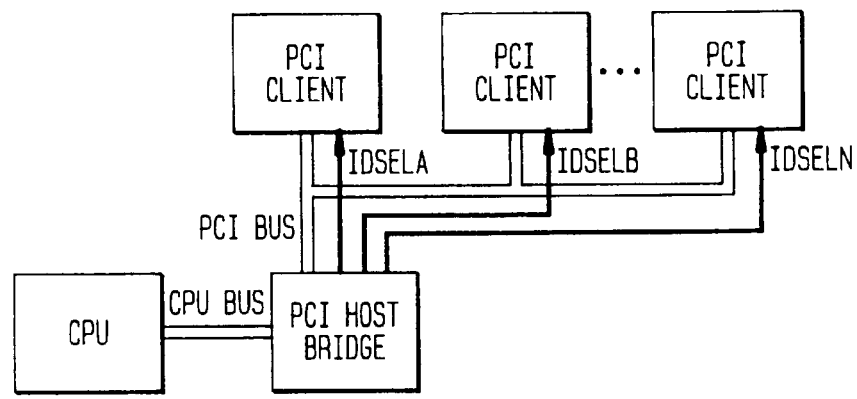
FIGS. 1 and 2 show arrangements for driving a PCI client from one and two sources.
Figure 2:
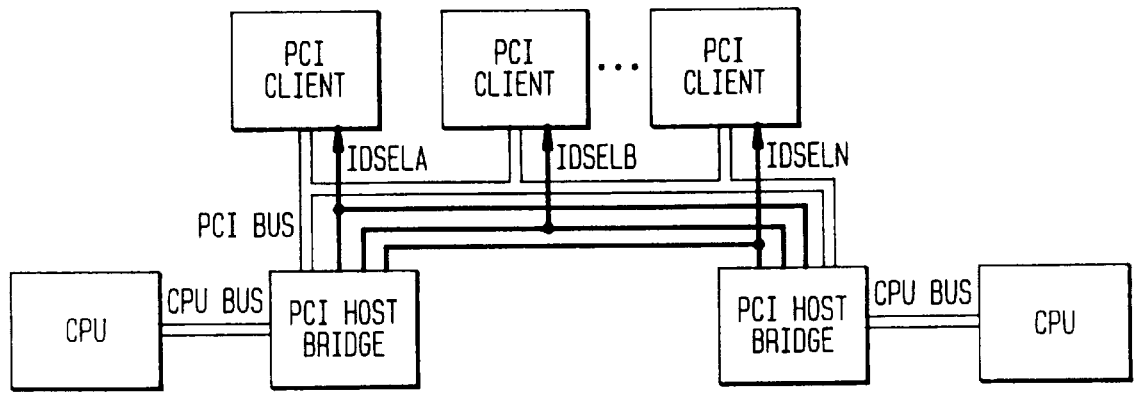
Figure 3:
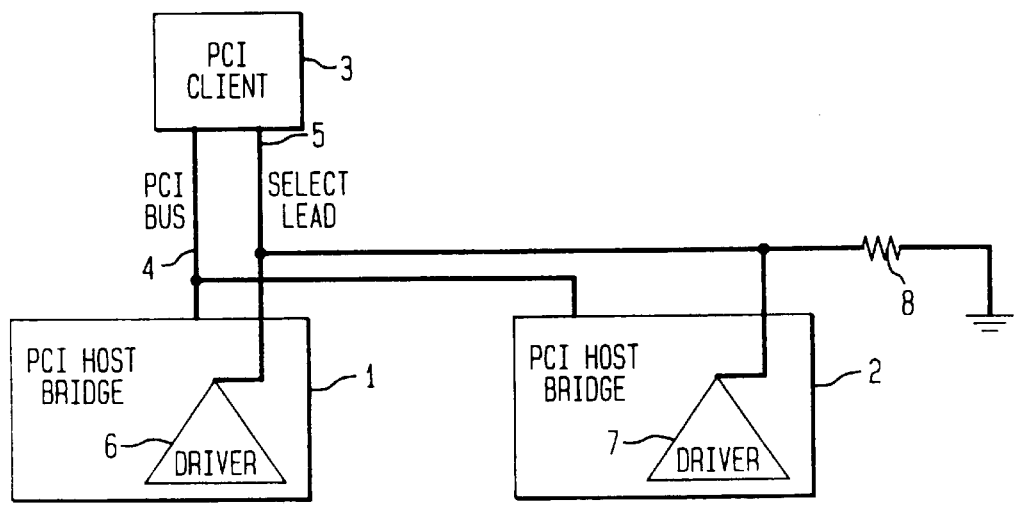
FIG. 3 shows an arrangement illustrative of applicants' invention.

FIG. 3 illustrates one embodiment of applicants' invention. PCI host bridge 1 and PCI host bridge 2 both drive a common PCI client 3, using PCI bus 4. The common client is selected using select lead 5 which is driven by a TTL driver 6 in PCI host bridge 1, and a TTL driver 7 in PCI host bridge 2. The characteristics of drivers 6 and 7 are that these units when not transmitting signals, are in a high impedance state to a low voltage (ground), and when transmitting, are in a low impedance state to either a positive signal (above 2 volts) or a low signal (below 0.8 volts). The high impedance is selected so that even if several drivers from different host bridges are paralleled, the load presented by that high impedance is not excessive and will not prevent an active driver from sending a high voltage signal. The select lead 5 is connected through a single resistor 8 to ground.

Only a single transmitting unit may transmit a low impedance, low voltage or low impedance, high voltage at a time. To meet the requirements of a specific applications performance needs, the active transmitting unit must transmit a low impedance, low voltage prior to transmitting a high impedance signal. The single resistor is selected so that a low voltage is maintained on the select lead when all transmitting units are transmitting a high impedance, and that the load presented by the resistance is not so large so that when the resistance is placed in parallel with the high impedance inactive state loads presented by the other drivers of lead 5, an active driver can still drive the signal on lead 5 to the high voltage state sufficiently quickly according to the needs of the specific application.

Advantageously, this arrangement allows a plurality of PCI host bridges to drive control and select leads for PCI clients on a PCI bus without deviating from the requirements for standard drivers used with the PCI bus. Specifically, applicants' have found that with a resistance of 1 kilohm (1 K), the signal transition time for two PCI host bridges connected to a PCI client using standard type of TTL printed wiring board is less than 30 nanoseconds, with a signal transmission rate of 33 mega Hertz (33 MHz). This is an entirely tolerable period between successive accesses to a particular PCI client.

The above description is of one preferred embodiment of applicants' invention. Many other variations will be apparent to those of ordinary skill in the art. The invention is only limited by the attached claims.

We claim:

1. Apparatus for driving a select lead from one of a plurality of peripheral component interconnect (PCI) host bridges comprising:

a driver in each of said host bridges having a low impedance for either of two states when controlling said select lead and a high impedance when not controlling said select lead;

said select lead is connected through a resistor having an impedance substantially less than the high impedance of said driver to a first voltage beyond a second voltage represented by either of the two low impedance states of said driver.

2. The apparatus of claim 1 wherein said first voltage is ground.

3. The apparatus of claim 1 wherein said second voltage is a supply voltage for said driver.

4. The apparatus of claim 1 wherein said resistance is approximately one kilohm.

* * * * *